May 8, 1962     F. W. BAUMANN ET AL     3,034,035

BRUSHLESS SYNCHRONOUS MACHINES

Filed Jan. 19, 1959     2 Sheets-Sheet 1

INVENTORS
FRED W. BAUMANN
GEORGE M. ROSENBERRY, JR.
BY James R. Campbell
THEIR ATTORNEY United States Patent Office 3,034,035
Patented May 8, 1962

3,034,035
BRUSHLESS SYNCHRONOUS MACHINES
Fred W. Baumann, Scotia, and George M. Rosenberry, Jr., Schenectady, N.Y., assignors to General Electric Company, a corporation of New York
Filed Jan. 19, 1959, Ser. No. 787,509
12 Claims. (Cl. 322—28)

The invention described herein relates to dynamoelectric machines and more particularly to brushless synchronous generators and motors.

In the usual synchronous generator or motor installation, a separate direct current generator is used for supplying the field excitation for the synchronous machine. In some cases, the D.C. generator or exciter is housed in a separate structure while in others, the magnetic cores of the D.C. generator and the synchronous machine are enclosed in the same frame. In either event, commutator and slip ring assemblies are required for collecting and transferring currents to obtain the desired operation. Since sparking occurs at the current collecting devices, such machines cannot be used in gaseous or explosive atmospheres. Also, they cannot be used effectively in low humidity environments because the brushes dust away rapidly as a result of inadequate lubrication normally provided by air of higher humidity. Recognizing this, motor manufacturers have improved the excitation systems for synchronous machines to an extent where the sliding contacts of the commutators and slip rings have been completely eliminated. The F. E. Crever Patent No. 2,414,287 assigned to the same assignee as the present invention, discloses such an improved system wherein the D.C. voltage for the field winding of the synchronous generator is supplied by a separate polyphase exciter, rather than from a separate D.C. source. The exciter rotor is on the same shaft as the synchronous generator field winding and the stator cores for both machines are placed side by side in a single housing. Upon rotation of the shaft, the polyphase alternating voltage output from the exciter is rectified by shaft mounted rectifiers and supplied to the main generator field winding on the rotor to furnish the needed direct current flow therein. Since the shaft is rotating, a voltage is induced in the generator armature or main winding which supplies current to power using devices. A closed excitation circuit is thereby provided which is void of sliding contacts and which provides the needed exciting current by transformer action.

The disadvantages of the kind of synchronous machine structures described above is that separate magnetic cores must be used for furnishing both the exciting and output currents. Sliding contacts have been eliminated to supply true brushless operation but the separate magnetic core components still exist thus providing essentially the same kind of operation involving substantially the same manufacturing costs. Where a separate stator and rotor core is used, the single rotor winding cannot efficiently perform its intended functions.

A different arrangement of windings in a synchronous machine has been suggested wherein a four pole D.C. field winding and an eight pole main or output winding of the generator are mounted in the same magnetic core. These windings are arranged to be mutually non-inductive, i.e., there is zero flux linkage between them. This is accomplished by making the number of poles in one winding twice that of the other. The rotor is provided with a single polyphase winding which is designed to serve both a four pole and eight pole function. The disadvantage of this construction is that at least one-third of the power delivered by the output winding must be supplied to the combined exciter and polyphase winding on the rotor of the frequency changer. Also, at conventional speeds, the frequencies are higher than that normally considered desirable, e.g. at 1800 r.p.m., the frequency is 180 cycles/second.

Another important aspect of the small synchronous generators is that the machines primarily are used for providing stand-by power or field power supply functions where efficiency and long life are not too important, or their use falls into areas where reliability is most important, as in communications systems, where accurate specifications and wave shapes are mandatory. Customer demands therefore have established a large gap between machines of exceptionally high and low quality and so it is evident that the need exists for a small synchronous generator capable of providing high efficiency and reliability and where the cost per unit is substantially the same as that heretofore associated with machines of lesser quality.

An object of our invention is to provide a high quality brushless synchronous machine of inexpensive construction capable of providing optimum performance characteristics by using a single set of rotor and stator magnetic cores having generator and exciter windings in the same slots.

Another object of our invention is to provide a brushless synchronous machine utilizing a single stator and rotor core having both generator and exciter windings wound in the same slots on both cores, and wherein each of the generator and exciter windings have a different number of poles for obtaining zero flux linkage between them.

In carrying out the objects of our invention, we eliminate the disadvantages of the prior art by providing single rotor and stator cores of a type corresponding with the magnetic and mechanical parts of a conventional wound rotor induction motor. The rotor and stator each have a single set of slots and a pair of windings are positioned in the same stator slots and in the same rotor slots; one set on the rotor and stator being the main generator windings while the other set comprises the exciter windings. To obtain brushless operation without having the flux produced by any one winding interfere adversely with the others, the windings are wound to be mutually non-inductive and therefore provide zero flux linkage therebetween. This is accomplished by designing the main generator windings to provide four-pole operation while the exciter windings are eight poles. A D.C. current in the exciter winding on the stator induces a stationary eight-pole field in the air gap. With the rotor turning at 1800 r.p.m., a 120 cycle, three-phase voltage is generated in the eight-pole rotor winding which is rectified by a shaft mounted three-phase rectifier. The D.C. output is fed into two phases of the four-pole rotor winding to produce the main rotating four-pole field which generates the 60 cycle output voltage in the four-pole stator winding.

While the specification concludes with claims particularly pointing out and distinctly claiming the subject matter which we regard as our invention, it is believed the invention will be better understood from the following description taken in conjunction with the accompanying drawings in which:

Figure 1:
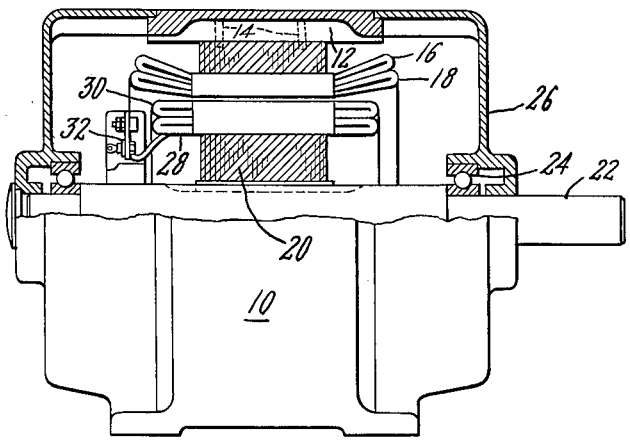
FIGURE 1 is a view in elevation, partly in section, of a brushless synchronous generator utilizing a single magnetic stator and rotor core.

Referring now to the drawings wherein like reference characters designate like or corresponding parts throughout the several views, there is shown in FIGURE 1 a brushless synchronous generator comprising a frame 10 enclosing a stator 12 consisting of silicon steel punchings welded together and held rigidly by dowel pins 14 and an interference fit within the frame. The stator core is slotted in the usual manner for receiving bar or random wound conductors but the slots are made slightly deeper for accommodating a pair of windings 16 and 18. The rotor core 20 likewise consists of a number of steel punchings pressed onto a shaft 22 arranged for rotation in bearings 24 held in position by end shields 26. Each rotor slot similarly is made deeper than usual for receiving a pair of windings 28 and 30. The generator described thus far, except for the pair of windings in each slot, is made from standard motor parts and is similar to a wound rotor induction motor.

In order to eliminate the two separate sets of rotor and stator cores which may be mounted within or outside of a single frame, a single magnetic stator and rotor core capable of performing both the generator and exciter functions, is used in which each slot is made deeper for receiving the two independent windings as previously mentioned.

Figure 2:
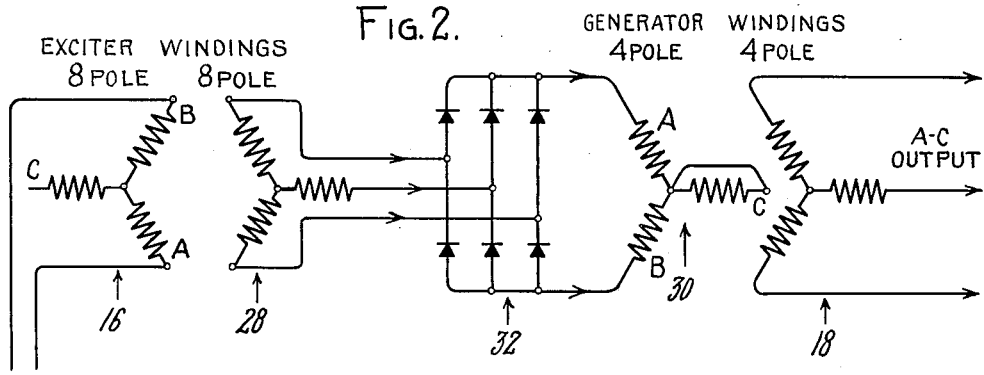
FIGURE 2 is a schematic showing of windings used on the generator of FIGURE 1.

Referring more specifically to FIGURES 1 and 2, it will be seen that the exciter field winding 16 is located in the deep portion of the slot and consists of three phases, although preferably only two legs are excited with D.C. voltage. The winding has eight poles which when energized with a D.C. voltage establishes a stationary eight-pole field in the air gap. With the rotor turning at 1800 r.p.m., a 120 cycle, three-phase voltage is generated in the eight-pole rotor winding 28. In order to provide direct current for the four-pole field winding 30, which is located in the same slots as the eight-pole winding 28, a three-phase rectifier 32 is connected to the output of the eight-pole winding. The three-phase rectifier is of a conventional type and is mounted on an end of the rotor, preferably on a fan blade which not only serves as a heat sink but also carries away heat from the rectifier by convection. The unidirectional current flow from the rectifier is fed to phases A and B of the four-pole winding 30. This produces the main rotating four-pole field in the air gap but which is stationary with respect to the rotor. The four-pole field thus induces a 60 cycle, three-phase voltage in the four-pole main pole output winding 18 on the stator.

Since both the generator and exciter windings are incorporated in the same magnetic structure and are energized at the same time, it is necessary to prevent interaction between the various magnetic fields and the consequent inducing of a voltage in a particular winding where it is not wanted. This is accomplished by using an arrangement of four and eight-pole windings which are mutually non-inductive. The four-pole flux does not induce a voltage in the eight-pole winding and the eight-pole flux does not induce a voltage in the four-pole winding. A voltage may be induced in individual coils of the winding but the net effect or total of the voltages for all coils in any phase of the winding is zero because the voltages cancel out between terminals of each phase of the winding. If the pitch of a four pole winding is less than 100%, an eight pole winding will produce a voltage in the four pole coils but it will cancel out between terminals. The difference in the number of poles need not be limited to four as described herein for obtaining zero flux linkage between them. Any ratio may be used but it is desirable not to have a difference of two poles because of unbalance of magnetic forces that would exist in the structure.

The eight-pole exciter winding 16 on the stator is shown as being a Y connected polyphase winding with only two legs energized. It is evident that a single phase winding can be used with advantage or any other type of winding that will establish a stationary field in the air gap having the desired number of poles. The same applies to the generator field winding 30 mounted on the rotor. The rotor winding 28 also may perform a dual function by having each phase of the polyphase winding constitute a parallel circuit for current flow. Stated differently, each leg of the winding would have the conductors therein connected in parallel. The primary function of the winding is to deliver power to the rectifiers for the four-pole main field winding 30. With this type of connection, it also serves as a uniform balanced amortisseur winding. Each phase of the winding is a four-pole shorted amortisseur and current is caused to circulate within the parallel branch in each phase of the complete winding.

Figure 3:
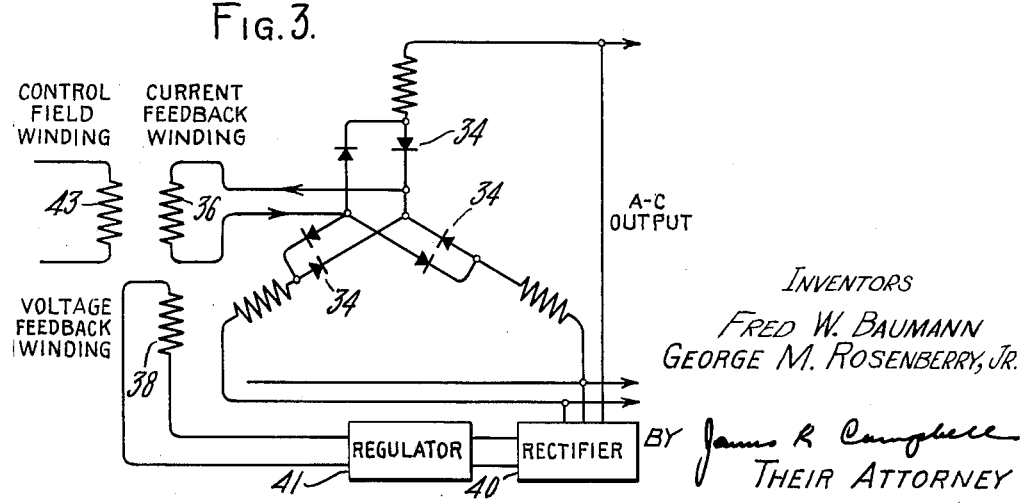
FIGURES 3–7 are schematic showings of feedback arrangements for supplying power to an exciter winding mounted in the stator.

This improved arrangement for utilizing a single stator and rotor core having dual windings in the same rotor and stator slots for carrying out a generator and exciter function, lends itself to many different modifications and variations. The scheme shown in FIGURE 3, of a feedback circuit used for self-exciting and for controlling the regulation characteristics of the generator, illustrates a variation wherein the voltage and current are fed from the main power output winding 18 back into the exciter field winding. Rectifiers 34 are connected in the three legs of the polyphase winding on the stator for providing unidirectional current flow to current winding 36, which serves the same purpose as the exciter winding 16 in the stator core of FIGURE 1. The use of a regulator is not necessary in this arrangement since current flow in the current winding 36 is directly proportional to load current flowing in the main output winding 18. A voltage feedback winding 38 also may be located in the same stator slots for furnishing additional excitation for the machine. The current and voltage windings preferably are located in different slots however, direct current is provided the voltage feedback winding by a single phase or three-phase rectifier 40 connected to output terminals of the main winding 18 and a regulator 41 may be used for providing the desired magnitude of voltage to the winding and providing small adjustment to compensate for temperature variations. The regulator may be any well known voltage regulator such as a magnetic amplifier, adjustable resistor of the electromagnetic contact type, amplidyne or other devices. The current and voltage feedback windings 36 and 38 may provide an exciter function separately or may coact to provide the desired values of current in the exciter winding. When used together the voltage and current feedback may be used to reduce the power requirements in a separately controlled field winding. Also, to insure voltage build-up of a self-excited machine, it may be desirable to use rotor or stator laminations with a higher than normal hysteresis loss. One way of obtaining this is by omitting the anneal cycle of the cold rolled steel. Alternatively, very high hysteresis punchings may be mixed with the conventional low loss punchings for the same purpose. The control field winding 43 shown as being in the same organization, also may be used with the current and voltage windings. When used alone, it would constitute a winding arrangement of the same type as that shown in FIGURE 1.

In operation, rotation of the rotor will cause winding 30 to induce an alternating potential in the main power output winding 18. A function of this potential is transmitted to the exciter winding 36 on the stator and the resulting current flow in the latter causes production of a stationary magnetic field in the air gap. Consequently at a speed of 1800 r.p.m., voltage will be induced in the secondary winding 28 and the frequency of this voltage will be twice the frequency of the voltage in the main power output winding 18. The speed and field intensity of winding 28 determines the magnitude of the voltage induced in the main power output winding 30 which in turn determines the intensity of the stationary field provided in the air gap.

Figure 4:
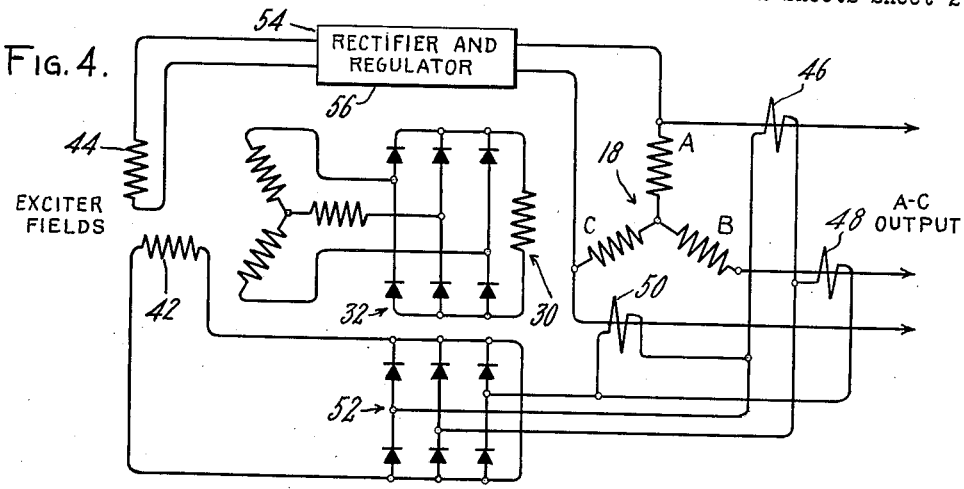

The winding arrangement may be modified for using an exciter with two distributed wound field windings as shown in FIGURE 4. The main power output winding 18 is positioned in stator slots as previously described and has two distributed exciter field windings 42 and 44 also wound therein but the axes of windings 42 and 44 are separated in space phase by any angle between zero and 90 electrical degrees. For obtaining unity power factor operation, the angle would be 90°. For zero power factor operation the angle would be zero degrees. As illustrated, current transformers 46, 48 and 50 are interconnected between the separate phases of winding 18 and rectifiers 52 which rectify and feed the output current from the transformers to winding 42. One current transformer may with advantage be used in lieu of the three shown. Line voltage is supplied to the field winding 44 through a rectifier 54 and regulator 56. The direct current thus provided the exciter field windings 42 and 44 establishes a stationary eight-pole field in the air gap which induces a voltage in the eight-pole rotor winding 28. This voltage is rectified in the same manner as that previously described and fed to the four-pole winding 30 which ultimately generates current flow in the main power output winding 18. An advantage derived from this winding arrangement is that the current transformers feeding the extra field reduces the output otherwise required by the voltage regulator 56, particularly when the angle of space displacement of windings 42 and 44 of the exciter field is chosen to satisfy a corresponding power factor load. In those instances where operation is from unity power factor to lagging power factor, it is desirable to use a 90° displacement in order to obtain satisfactory unity power factor operation. In addition to requiring less output from the regulator, this arrangement also provides sustained short circuit current. The voltage regulator 56 can be omitted in those instances where the performance requirements are not too severe and the rectifier 54 than can be used alone to feed the potential field 44. The operation under this latter condition is improved if the generator is designed as a saturated machine. It is to be noted that this principle is also applicable to separately excited A.C. exciters especially since some empty slots usually are available in that type of machine.

Figure 5:
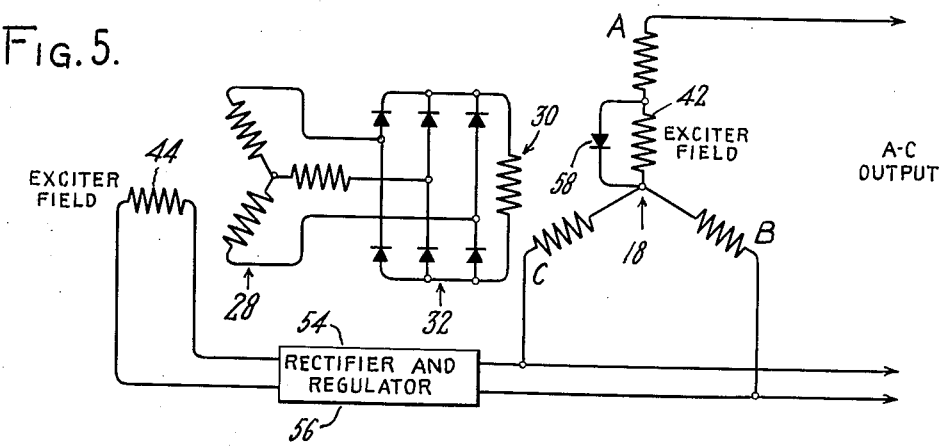

FIGURE 5 illustrates an arrangement somewhat similar to that shown in FIGURE 4. In FIGURE 5, current compensation is obtained without the use of a current transformer. This is accomplished by connecting the exciter current winding 42 in series with one phase of the main power output winding 18. The field winding is then shunted by a rectifier 58. The other field winding 44 is connected to the output winding in the same manner as that previously described in connection with FIGURE 4. With this type of connection, the rectifier 58 will carry substantially all of the positive half cycle of the line current and the field winding 42 will carry all the negative half cycle of current. The average current through the exciter field winding is then about 45% of the R.M.S. line current. This scheme is particularly good for small generators because it eliminates the extra cost associated with a current transformer. When combined with a saturated machine, it gives fairly good voltage regulation even without the use of a voltage regulator.

Figure 6:
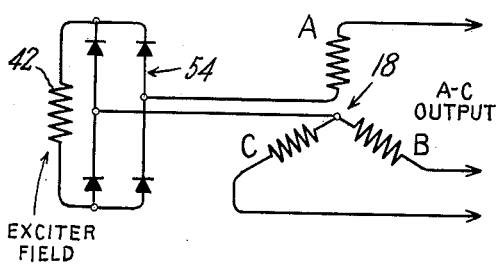
Figure 7:
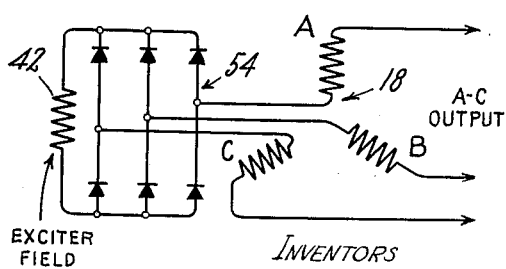

Current feedback to the field winding 42 without the use of current transformers may be accomplished in other ways also. FIGURE 6 illustrates an arrangement wherein the winding 42 is connected in series with one phase of the main power output winding 18 and rectifiers 54, while the embodiment of FIGURE 7 shows an arrangement for feeding current to the winding 42 through a three-phase rectifier connected to each phase of the main windings.

In view of the above, it will be evident that many modifications and variations are possible in light of the above teachings. The primary concept is that of using a single magnetic rotor and stator core having mutually non-inductive generator and exciter field windings located in the same rotor and stator slots. The above disclosure shows various ways of establishing a stationary field in the air gap, i.e., by energizing the exciter winding from a remote source or by feedback arrangements, and it will be evident to those skilled in the art that other arrangements falling within the scope of these teachings also may be utilized.

What we claim as new and desire to secure by United States Letters Patent is:

1. A brushless synchronous machine comprising a shaft mounted rotor arranged for rotation in a stator, conductor slots in each of the rotor and stator, multi-pole generator windings comprising conductors mounted in the rotor and stator slots, multi-pole exciter windings comprising conductors located in the same slots as the conductors of the generator windings, said generator windings having a different number of poles than the exciter windings so as to be mutually non-inductive and thereby have zero flux linkage between them, said exciter windings comprising a field winding on the stator and a secondary winding on the rotor, rectifier means mounted on an end of the rotor for supplying unidirectional current flow from the exciter secondary winding to the field winding of the generator, so that upon rotation of the rotor a field is established in the air gap for generating a voltage in the generator main output winding.

2. A brushless synchronous machine comprising a shaft mounted rotor arranged for rotation in a stator, conductor slots in each of the rotor and stator, multi-pole generator windings comprising conductors mounted in the rotor and stator slots, multi-pole exciter windings comprising conductors located in the same slots as the conductors of the generator windings, said generator windings having a different number of poles than the exciter windings so as to be mutually non-inductive and thereby have zero flux linkage between them, said exciter windings comprising a stator field winding and a secondary winding on the rotor, means connected with the field winding for establishing a stationary field in the air gap and thereby inducing a polyphase voltage in the secondary winding when the rotor operates, rectifier means interconnecting the exciter secondary winding and the field winding of the generator for providing a rotating field in the air gap of sufficient intensity for generating the desired value of current in the generator main output winding.

3. A brushless synchronous machine comprising a shaft mounted rotor arranged for rotation in a stator, conductor slots in each of the rotor and stator, multi-pole generator windings comprising conductors mounted in the rotor and stator slots, multi-pole exciter windings comprising conductors located in the same slots as the conductors of the generator windings, said generator windings having a different number of poles than the exciter windings so as to be mutually non-inductive and thereby have zero flux linkage between them, said exciter windings comprising a stator field winding and a secondary winding on the rotor, rectifier means interconnecting a secondary winding with a generator field winding which generates current flow in the main output winding on the stator, and voltage feedback means between the generator output and exciter field windings for supplying the desired magnitude of exciting current to the latter when the machine is in operation.

4. The combination according to claim 3 wherein current feedback means interconnects the generator main output winding with a current winding also comprising the exciter field winding for providing the desired degree of excitation in the field winding.

5. The combination according to claim 4, wherein means are interposed in the feedback means for supplying a direct current of the desired value to the exciter windings.

6. The combination according to claim 3 wherein said feedback means comprises connecting the exciter field winding in series with one phase of the main output winding and rectifier means for furnishing unidirectional current flow in the exciter windings.

7. A combination according to claim 3 wherein the feedback means comprises rectifier means respectively connected with each phase of the main power output winding, and means connecting the exciter field winding across the output terminals of the rectifier means.

8. A brushless synchronous machine comprising a shaft mounted rotor arranged for rotation in a stator, conductor slots in each of the rotor and stator, multi-pole generator windings comprising conductors mounted in the rotor and stator slots, multi-pole exciter windings comprising conductors located in the same slots as the conductors of the generator windings, said generator windings having a different number of poles than the exciter windings so as to be mutually non-inductive and thereby provide zero linkage flux between them, said exciter windings comprising a pair of distributed wound field windings in the stator having their axes in spaced phase relationship, an exciter secondary winding on the rotor inductively coupled with the exciter field windings for producing a polyphase voltage at its output terminals, rectifier means interconnecting the secondary winding with a rotor mounted field winding for the generator for establishing a rotating field in the machine air gap during operation and thereby generating current flow in the main output winding on the stator, and means connected with the exciter field windings for providing the desired degree of excitation for the machine.

9. The combination according to claim 8 wherein said means comprises a feedback circuit interconnecting the main power output winding with the exciter field windings for supplying a function of the line voltage to the field windings.

10. The combination according to claim 8 wherein said means comprises a feedback circuit for supplying the exciter field windings with a component of the voltage and current generated in the main power output winding.

11. The combination according to claim 8 wherein said means comprises a feedback circuit including current transformers and rectifiers between each phase of the main power output winding and one of the exciter field windings, and including rectifier and voltage regulating means interconnecting the output winding with the other field winding comprising the exciter.

12. The combination according to claim 8 wherein means comprises a feedback circuit including rectifier and voltage regulating means interconnecting the output winding with one of the exciter field windings, and the other field winding of the exciter being serially connected with one phase of the main output winding including a rectifier connected in shunt with the field winding.

No references cited.